(12) United States Patent
Chiang

(10) Patent No.: US 8,072,312 B2
(45) Date of Patent: Dec. 6, 2011

(54) CONTACTLESSLY RECHARGEABLE IDENTIFICATION DEVICE AND METHOD THEREOF

(75) Inventor: Cyril Chiang, Taipei (TW)

(73) Assignee: ID Enabler Corporation, Taipei (TW)

( * ) Notice: Subject to any disclaimer, the term of this patent is extended or adjusted under 35 U.S.C. 154(b) by 0 days.

(21) Appl. No.: 11/914,390

(22) PCT Filed: Aug. 10, 2007

(86) PCT No.: PCT/CN2007/002408
§ 371 (c)(1),
(2), (4) Date: Nov. 14, 2007

(87) PCT Pub. No.: WO2009/021352
PCT Pub. Date: Feb. 19, 2009

(65) Prior Publication Data
US 2010/0134259 A1    Jun. 3, 2010

(51) Int. Cl.
*G08B 21/00* (2006.01)
(52) U.S. Cl. .................. 340/10.34; 340/572.1; 340/10.1
(58) Field of Classification Search ............... 340/572.1, 340/10.1
See application file for complete search history.

(56) References Cited

U.S. PATENT DOCUMENTS

| | | | | |
|---|---|---|---|---|
| 5,963,133 | A * | 10/1999 | Monjo | 340/572.1 |
| 6,897,763 | B2 * | 5/2005 | Schulmerich et al. | 340/5.91 |
| 7,394,381 | B2 * | 7/2008 | Hanson et al. | 340/572.4 |
| 2006/0181421 | A1 * | 8/2006 | Forcier et al. | 340/572.1 |
| 2006/0244568 | A1 * | 11/2006 | Tong et al. | 340/10.41 |
| 2006/0255943 | A1 * | 11/2006 | Hougen et al. | 340/572.1 |
| 2007/0018832 | A1 * | 1/2007 | Beigel et al. | 340/572.7 |
| 2007/0132581 | A1 * | 6/2007 | Molyneaux et al. | 340/551 |

FOREIGN PATENT DOCUMENTS

| | | |
|---|---|---|
| JP | 2005-202710 | 7/2005 |
| TW | M246884 Y | 10/2004 |

OTHER PUBLICATIONS

Tawainese Office Action Issued Feb. 9, 2011.

* cited by examiner

*Primary Examiner* — Jennifer Mehmood
*Assistant Examiner* — Mark Rushing
(74) *Attorney, Agent, or Firm* — Volpe and Koenig, P.C.

(57) ABSTRACT

A non-contact state charging authentication device and a method thereof are disclosed. The authentication device includes: a power supply for receiving and transmitting power; a control unit for controlling a signal; a shunt and voltage divided circuit connecting to the said power supply and the said control unit for controlling the transmission of power; and an electromagnetic inductance element connecting to the said shunt current and voltage divided circuit for inducting and transmitting an electromagnetic signal which has an electromagnetic inductance frequency. While non-contact electromagnetic induction between the said authentication device and a charging device occurs, the said charging device begins to charging the said authentication device.

20 Claims, 4 Drawing Sheets

CONTACTLESSLY RECHARGEABLE IDENTIFICATION DEVICE AND METHOD THEREOF

FIELD OF THE INVENTION

The present invention relates to an identification device and the charging method thereof. In particular, the present invention relates to a contactlessly charging method for a battery-powered identification device.

BACKGROUND OF THE INVENTION

As frauds become widespread and serious, more and more financial transactions today require a second identification in addition to the traditional PIN code in order to confirm the correct user identity. From banking transaction to Internet logon, correct user identify has been acknowledged the first gateway to total security.

Today's ID documents, driving license or citizen identification, merely provide passive function upon identification. Even with advanced anti-fake technologies to prevent them from being forged, they can not play any active role to identify the genuine user when security becomes a concern.

Sound and effective identification technologies should be duplication, modification and decipherment proof. Three main technologies are used today to meet those requirements, i.e. (1) one-time password (OTP); (2) radio frequency identification (RFID); and (3) biological characterization such as fingerprint or retina.

All above methods need electricity to drive components therein. A small primary (non-chargeable) battery is presently designed to provide electricity. It is difficult to replace battery because of the small footprint of device. Sometimes those batteries are simply impossible to be replaced, resulting in a limited device lifetime due to power shortage. To replace the device is costly and also risky concerning data integrity. It is an essential challenge to provide durable and reliable power to identification devices.

Besides the physical contact between metal electrode of charging device and that of charged device, power charge can also be performed without physical contact.

At present, there are two charging technologies able to charge device contactlessly, i.e. electromagnetic induction and radio frequency.

Electromagnetic induction works with an electromagnetic field generated by coil or antenna in the charging device. Electromagnetic energy is generated thereof and subsequently received by coil or antenna in the charged device. Electricity transformed from the electromagnetic energy is stored in battery within charged device. Such technology has been applied to power charge toothbrush. Soon in the future it will be used to charge mobile phone, PDA and many other small portable gadgets.

Radio frequency carries and transmits information. Theoretically, electricity can be transmitted by radio frequency from one device to another by frequency modulation. This technology has not been commercially used because of low efficiency.

Up to date we have not seen electromagnetic energy applied to power charge identification device without physical contact with charging device. By doing so, identification device will be able to certify user identity instantly and flawlessly with a considerably prolonged lifetime, consequently reducing replacement cost while enhancing data and information integrity.

It is therefore attempted by the applicant to solve above-mentioned problems encountered in prior arts.

SUMMARY OF THE INVENTION

In accordance with one aspect of the present invention, an identification device is provided. The identification device comprises a power supply for providing an electricity; a control unit for controlling a signal; a current and voltage partition circuit electrically connected to the power supply and the control unit for controlling a transmission of the electricity; and an electromagnetic inductive element electrically connected to the current and voltage partition circuit for producing an electromagnetic inductive signal having an electromagnetic inductive frequency. The identification device is charged by a charging device when an electromagnetic induction is generated between the identification device and the charging device.

Preferably, the power supply is a battery.

Preferably, the battery is a rechargeable lithium-ion battery.

Preferably, the current and voltage partition circuit is further electrically connected to the power supply through a protection circuit.

Preferably, the electromagnetic inductive element is one of an electromagnetic inductive coil and a radio frequency device.

Preferably, the electromagnetic inductive signal is one selected from a group consisting of a relatively low frequency signal, a relatively high frequency signal, a relatively ultra-high frequency signal, and a microwave signal.

In accordance with another aspect of the present invention, an identification device is provided. The identification device comprises a battery providing an electricity; a control unit for controlling a signal; a current and voltage partition circuit electrically connected to the battery and the control unit for controlling a transmission of the electricity; an electromagnetic inductive element electrically connected to the current and voltage partition circuit for producing an electromagnetic inductive signal having an electromagnetic inductive frequency; a display electrically connected to the control unit for displaying an information; and a keyboard electrically connected to the control unit and having at least a button inputting an indication to the identification device. The identification device is charged by a charging device when an electromagnetic induction is generated between the identification device and the charging device without physical contact.

Preferably, the battery is a rechargeable lithium-ion battery.

Preferably, the current and voltage partition circuit is further electrically connected to the battery through a protection circuit.

Preferably, the electromagnetic inductive element is one of an electromagnetic coil and a radio frequency device.

Preferably, the electromagnetic inductive signal is one selected from a group consisting of a relatively low frequency signal, a relatively high frequency signal, a relatively ultra-high frequency signal, and a microwave signal.

Preferably, the display is a flexible flat panel display.

Preferably, the identification device further comprises a light emitting diode (LED) electrically connected to the control unit for displaying the remaining power in the battery.

In accordance with another aspect of the present invention, a charging method for an identification system is provided. The charging method for the identification system comprises an identification device and a charging device, wherein the identification device comprises a first power supply, a current and voltage partition circuit and a first electromagnetic inductive element; the charging device comprises a second power supply and a second electromagnetic inductive element. The identification system also comprises a first frequency produced from the first electromagnetic inductive element and a second frequency produced from the second electromagnetic inductive element while both frequencies are identical. The charging method comprises steps of: (a) coupling the first frequency and the second frequency; (b) transforming an electricity in the second power supply into an electromagnetic energy in the second electromagnetic inductive element; (c) transforming the electromagnetic energy in the second electromagnetic inductive element into an electromagnetic energy in the first electromagnetic inductive element; (d) transforming the electromagnetic energy in the first electromagnetic inductive element into an input electricity and transmitting the input electricity to the current and voltage partition circuit; and (e) providing the input electricity to the first power supply.

Preferably, the input electricity provided by the current and voltage partition circuit is one of a total input electricity and a fraction of the total input electricity.

Preferably, the input electricity provided by the current and voltage partition circuit has a voltage not lesser than an operation voltage of the first power supply.

Preferably, the input electricity provided by the current and voltage partition circuit has a current time product not greater than the capacity of the first power supply.

Preferably, the second electromagnetic inductive element has an electromagnetic induction field with which a plurality of identification devices can be charged within an effective range of the electromagnetic induction field.

Preferably, a shortest distance between the identification device and the charging device is zero.

Preferably, a longest distance between the identification device and the charging device is equivalent to the longest distance of the effective range of the electromagnetic induction field generated by the second electromagnetic inductive element.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
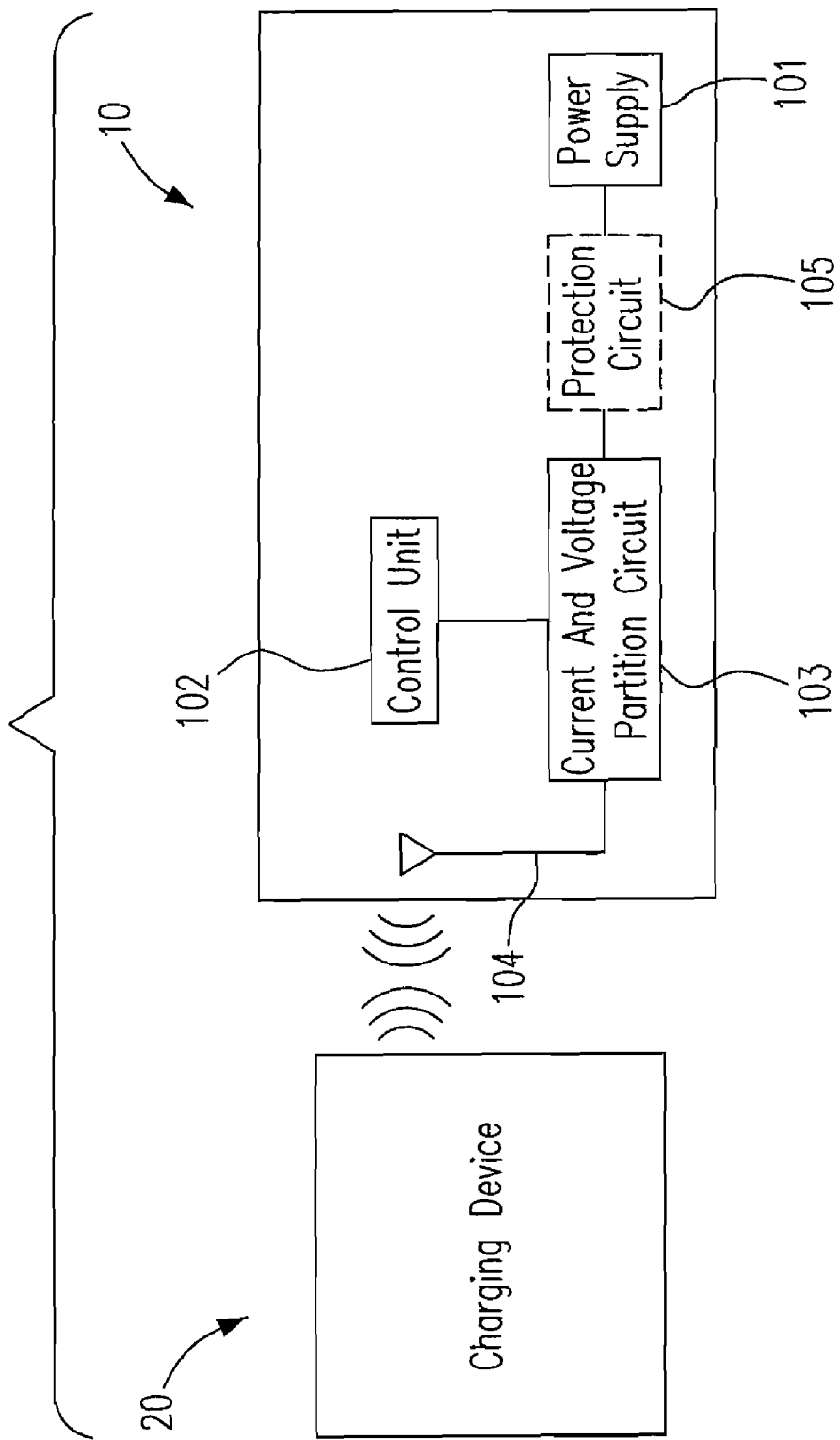
FIG. 1 is a diagram showing an identification device in accordance with the first preferred embodiment of the present invention.

Please refer to FIG. 1, which is the diagram showing an identification device in accordance with the first preferred embodiment of the present invention. In FIG. 1, the identification device 10 includes a power supply 101, a control unit 102, a current and voltage partition circuit 103, an electromagnetic inductive element 104, and a protection circuit 105. The current and voltage partition circuit 103 is electrically connected to the power supply 101 (it can be electrically connected through the protection circuit 105), the control unit 102, and the electromagnetic inductive element 104, respectively. When the identification device 10 suffers from power shortage, the user places the identification device near the charging device 20. The contactlessly electromagnetic induction is formed between both. One part of the electricity generated by the electromagnetic inductive element 104 charges the power supply 101 (it can be electrically connected through the protection circuit 105) through current and voltage partition circuit 103, and another part of the electricity thereof powers the control unit 102. The control unit 102 can determine the mode of power source.

Please continue to refer to FIG. 1, where a lithium-ion battery with the advantages of small volume and low memory effect is chosen as the power supply 101. The power supply 101 can also be electrically connected to a protection circuit 105 which provides the safety to identification device when it is charged. The electromagnetic inductive element 104 is one of an electromagnetic inductive coil and a radio frequency element. However, the corresponding charging device 20 needs to choose an electromagnetic inductive coil or a radio frequency element identical with the electromagnetic inductive element 104 in order to generate a contactlessly electromagnetic induction. Furthermore, the adequate frequency range of the contactlessly electromagnetic induction includes one selected from a group consisting of the low frequency (30~300 kHz), the high frequency (3~30 MHz), the ultra-high frequency (300 MHz~3 GHz) and the microwave (higher than 3 GHz).

Figure 2:
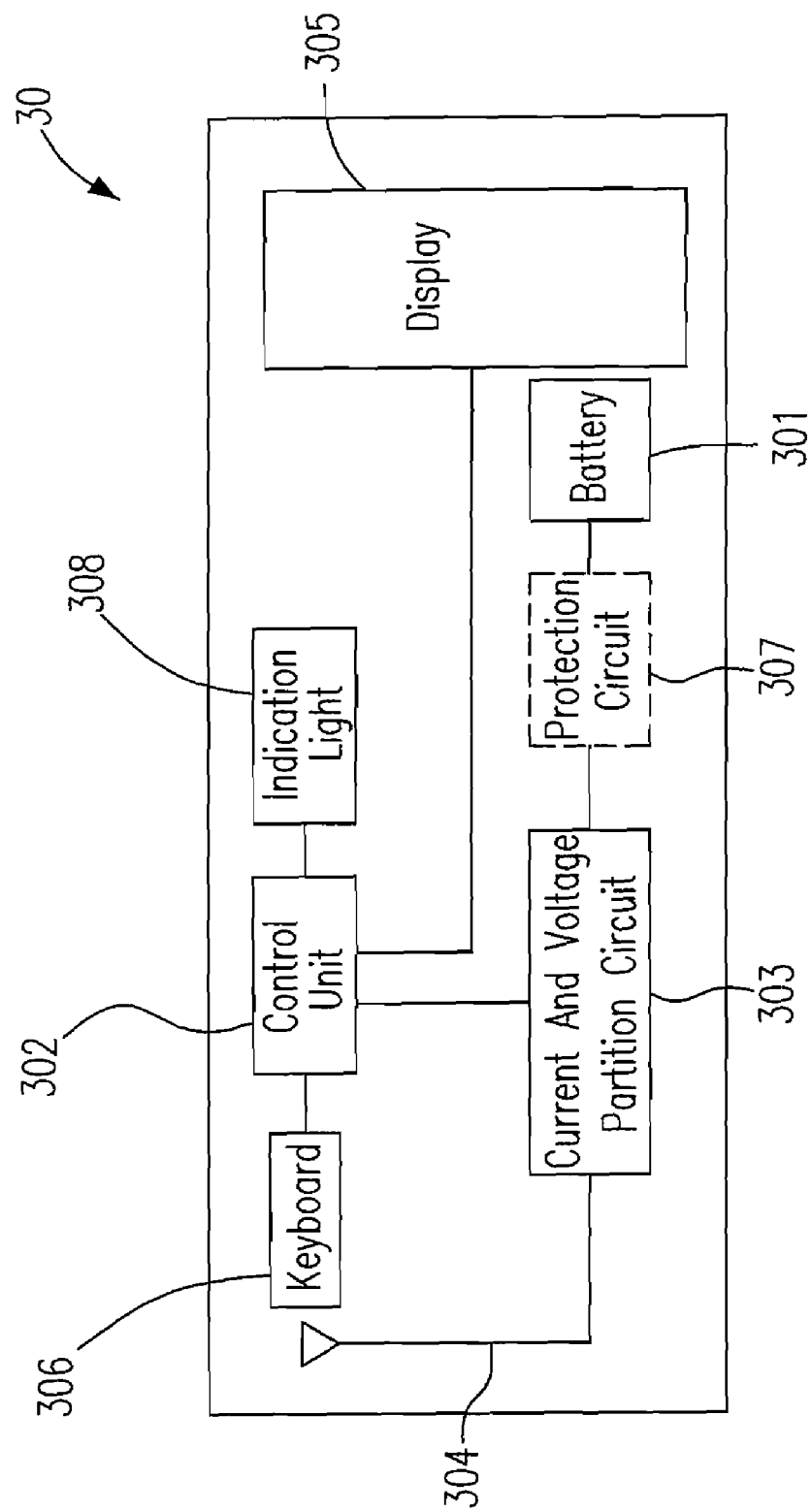
FIG. 2 is a diagram showing an identification device in accordance with the second preferred embodiment of the present invention.

Please refer to FIG. 2, which is a diagram showing an identification device in accordance with the second preferred embodiment of the present invention. In FIG. 2, the identification device 30 includes a battery 301, a control unit 302, a current and voltage partition circuit 303, an electromagnetic inductive element 304, a display 305, a keyboard 306, and a protection circuit 307, wherein the current and voltage partition circuit 303 is electrically connected to the battery 301 (it could be electrically connected through the protection circuit 307), the control unit 302, and the electromagnetic inductive element 304, respectively. The control unit 302 is electrically connected to the display 305 and the keyboard 306. When the identification device 30 suffers from power shortage, the user places the identification device 30 near the charging device (not shown in FIG. 2), and the contactlessly electromagnetic induction is formed between both. One part of the electricity generated by the electromagnetic inductive element 304 charges the battery 301 (it could be electrically connected through the protection circuit 307) through the current and voltage partition circuit 303, and another part of the electricity thereof powers the control unit 302. The control unit 302 can determine the mode of power source.

Please continue to refer to FIG. 2, where the battery 301 is a rechargeable lithium-ion battery preferably. Choosing the rechargeable battery can overcome the problem that (1) the battery 301 needs to be replaced frequently, (2) risk in damaging the identification device 30 upon battery replacement, and (3) cost issue. The battery 301 is manufactured, including but not limited to a thin rectangular shape, in accordance with the outlook of identification device 30.

Please continue to refer to FIG. 2, where the electromagnetic inductive element 304 is one of the electromagnetic inductive coil and a radio frequency element. However, the corresponding charging device (not shown in FIG. 2) needs to choose an electromagnetic inductive coil or a radio frequency element identical with the electromagnetic inductive element 304 in order to generate a contactlessly electromagnetic induction. Furthermore, the adequate frequency range of the contactlessly electromagnetic induction includes one selected from a group consisting of the low frequency, the high frequency, the ultra-high frequency, and the microwave. The display 305, preferably a flexible flat panel display, is used to show information generated by the control unit 302. The keyboard 306 is used to input indication to the identification device 30. The keyboard 306 has at least a button. The current and voltage partition circuit 303 can be electrically connected to a protection circuit 307 to avoid damage of the identification device 30 upon power charge. The indication light 308 is used to show the remaining power and charging status of the battery 301. The light source of the indication light 308 preferably is a light emitting diode (LED) because of low power consumption, mercury free, and long lifetime.

The identification devices (10, 30) of the present invention are applied to all battery-powered identification devices in any style, including but not limited to handheld electronic devices, cards, labels, tags, papers, etc.

Figure 3:
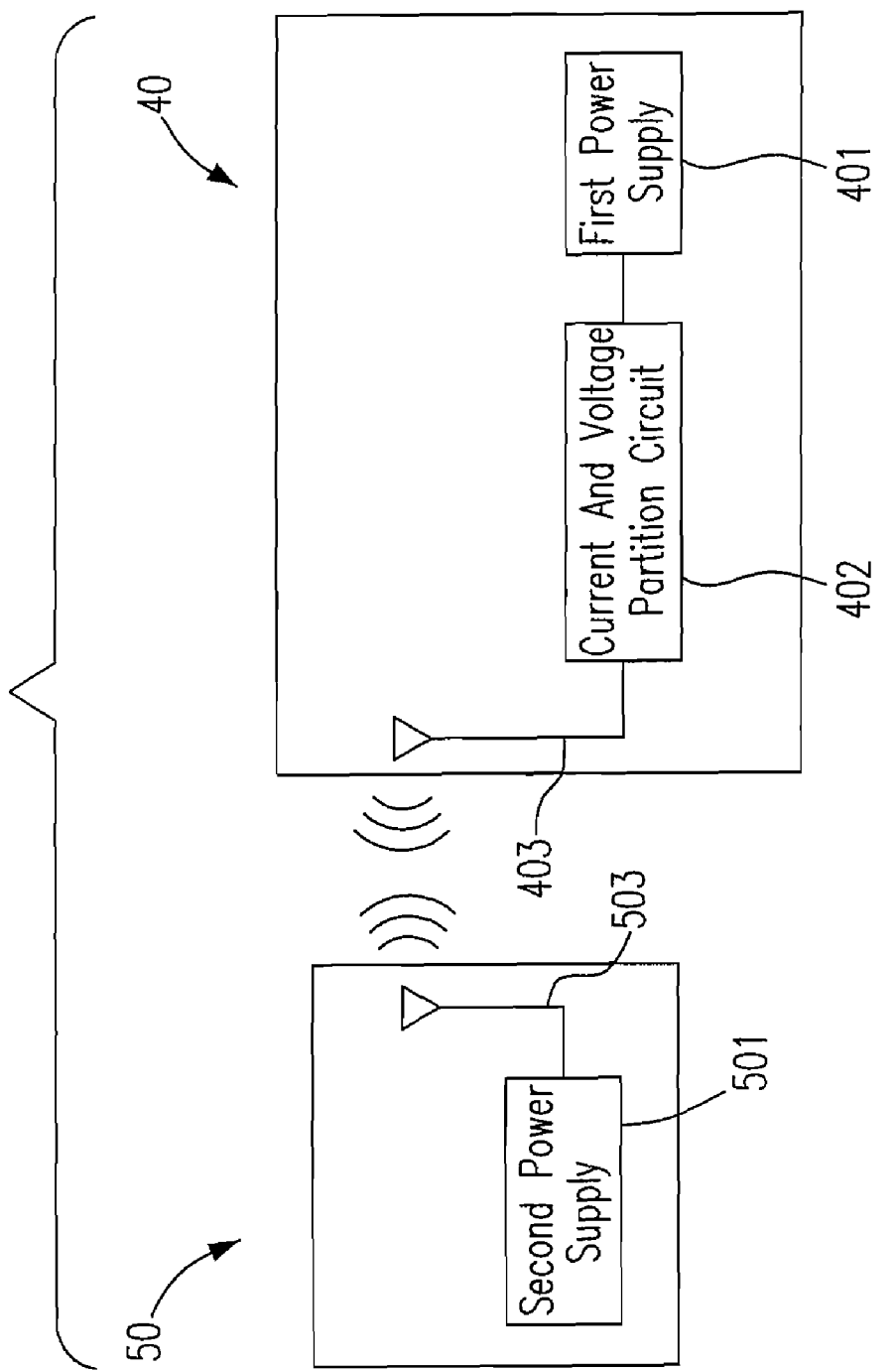
FIG. 3 is a diagram showing an identification device and a charging device of the present invention.

Please refer to FIG. 3, which is a diagram showing an identification device and a charging device of the present invention. In FIG. 3, the identification device 40 includes a first power supply 401, a current and voltage partition circuit 402, and a first electromagnetic inductive element 403. The charging device 50 includes a second power supply 501 and a second electromagnetic inductive element 503, wherein the first frequency generated by the first electromagnetic inductive element 403 is identical with the second frequency generated by the second electromagnetic inductive element 503.

Figure 4:
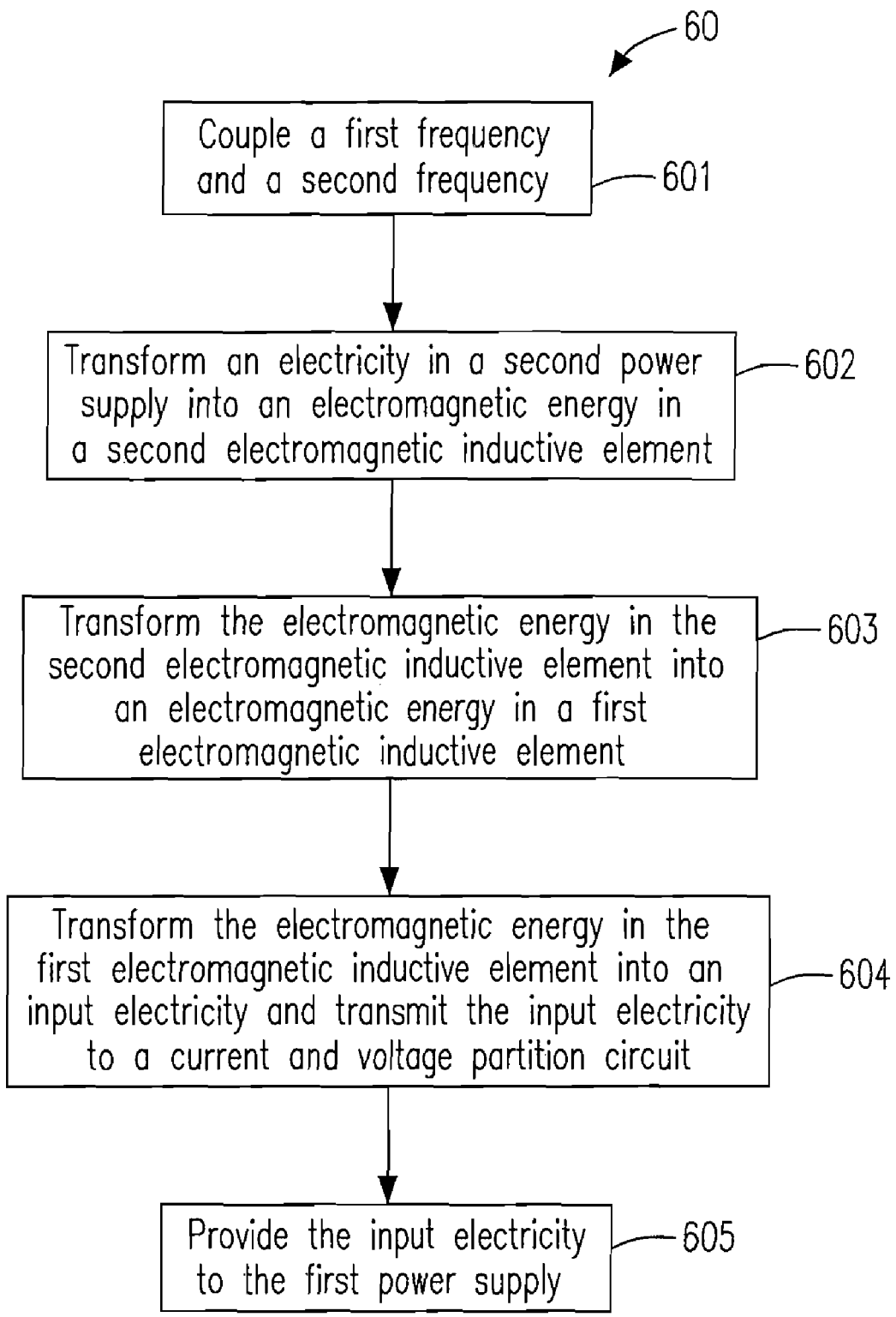
FIG. 4 is a flowchart showing a charging method of an identification device of the present invention.

Please refer to FIG. 4, which is a flowchart showing a charging method for an identification system of the present invention. In accordance with the diagram of the identification device 40 and the charging device 50 in FIG. 3 and the flowchart of the charging method for the identification system in FIG. 4, it is known that when the identification device 40 is charged by the charging device 50, it includes the steps of: (a) coupling the first frequency and the second frequency (step 601); (b) transforming an electricity in the second power supply 501 into an electromagnetic energy in the second electromagnetic inductive element 503 (step 602); (c) transforming the electromagnetic energy in the second electromagnetic inductive element 503 into an electromagnetic energy in the first electromagnetic inductive element 403 (step 603); (d) transforming the electromagnetic energy in the first electromagnetic inductive element 403 into an input electricity and transmitting the input electricity to the current and voltage partition circuit 402 (step 604); and (e) providing the input electricity to the first power supply 401 (step 605).

Among these, the first and second frequencies in step (a) must be identical so as to proceed the charging procedure. In addition, the electromagnetic energy is transformed from the second electromagnetic inductive element 503 to the first electromagnetic inductive element 403 by contactless electromagnetic induction in step (b) and step (c). The shortest distance between the identification device 40 and the charging device 50 is zero while the longest distance thereof is the limit of the range of the electromagnetic induction field. Longer distance may result in poor or unfunctional induction.

In step (e), the electricity provided by the current and voltage partition circuit 402 is one of the total and a fraction of the total input electricity. When the identification device 40 is charged by the charging device 50 and identification device 40 is not in use, the current and voltage partition circuit 402 provides the entire electricity to the first power supply 401. When the identification device 40 is charged by the charging device 50 and the identification device 40 is in use, the current and voltage partition circuit 402 provides partial electricity to the first power supply 401 with another partial electricity for the usage of the identification device 40.

In step (e), the voltage of electricity provided by the current and voltage partition circuit 402 should be equal to or higher than the operation voltage of the first power supply 401, and the current time product provided by the current and voltage partition circuit 402 should be equal to or less than the capacity of the first power supply 401.

Please continue to refer to FIG. 4, where the charging method of the identification device of the present invention can be applied to a plurality of identification device 40 within the range of an electromagnetic induction field generated by the electromagnetic induction of the charging device 50. The advantages lie in that the user can charge more than one identification devices 40 at the same time, saving space and cost of charging device 50.

According to the above description, it is known that the battery-powered identification device of the present invention can be charged without physical contact with charger. It will solve the problem of power shortage in identification device, bringing long lifetime operation of identification device in more applications.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. An identification device, comprising:
   a power supply providing an electricity;
   a control unit for controlling a signal;
   a current and voltage partition circuit electrically connected to the power supply and the control unit for controlling a transmission of the electricity; and
   an electromagnetic inductive element electrically connected to the current and voltage partition circuit for producing an electromagnetic inductive signal having an electromagnetic inductive frequency,
   wherein the identification device is charged by a charging device when an electromagnetic induction is generated between the identification device and the charging device.

2. The identification device according to claim 1, wherein the power supply is a battery.

3. The identification device according to claim 2, wherein the battery is a rechargeable lithium-ion battery.

4. The identification device according to claim 1, wherein the current and voltage partition circuit is further electrically connected to the power supply through a protection circuit.

5. The identification device according to claim 1, the electromagnetic inductive element is one of an electromagnetic inductive coil and a radio frequency device.

6. The identification device according to claim 1, the electromagnetic inductive signal is one selected from a group consisting of a relatively low frequency signal, a relatively high frequency signal, a relatively ultra-high frequency signal, and a microwave signal.

7. An identification device, comprising:
a battery providing an electricity;
a control unit for controlling a signal;
a current and voltage partition circuit electrically connected to the battery and the control unit for controlling a transmission of the electricity;
an electromagnetic inductive element electrically connected to the current and voltage partition circuit for producing an electromagnetic inductive signal having an electromagnetic inductive frequency;
a display electrically connected to the control unit for displaying an information; and
a keyboard electrically connected to the control unit and having at least a button inputting an indication to the identification device,
wherein the identification device is charged by a charging device when an electromagnetic induction is generated between the identification device and the charging device.

8. The identification device according to claim 7, wherein the battery is a rechargeable lithium-ion battery.

9. The identification device according to claim 7, wherein the current and voltage partition circuit is further electrically connected to the battery through a protection circuit.

10. The identification device according to claim 7, the electromagnetic inductive element is one of an electromagnetic coil and a radio frequency device.

11. The identification device according to claim 7, the electromagnetic inductive signal is one selected from a group consisting of a relatively low frequency signal, a relatively high frequency signal, a relatively ultra-high frequency signal, and a microwave signal.

12. The identification device according to claim 7, wherein the display is a flexible flat panel display.

13. The identification device according to claim 7, further comprising a light emitting diode (LED) electrically connected to the control unit for displaying a remaining power in the battery.

14. A charging method for an identification system comprising an identification device and a charging device, wherein the identification device comprises a first power supply, a current and voltage partition circuit and a first electromagnetic inductive element; the charging device comprises a second power supply and a second electromagnetic inductive element, and a first frequency produced from the first electromagnetic inductive element and a second frequency produced from the second electromagnetic inductive element while both frequencies are identical, the method comprising steps of:
(a) coupling the first frequency and the second frequency;
(b) transforming an electricity in the second power supply into an electromagnetic energy in the second electromagnetic inductive element;
(c) transforming the electromagnetic energy in the second electromagnetic inductive element into an electromagnetic energy in the first electromagnetic inductive element;
(d) transforming the electromagnetic energy in the first electromagnetic inductive element into an input electricity and transmitting the input electricity to the current and voltage partition circuit ; and
(e) providing the input electricity to the first power supply.

15. The charging method according to claim 14, wherein the input electricity provided by the current and voltage partition circuit is one of a total input electricity and a fraction of the total input electricity.

16. The charging method according to claim 14, wherein the input electricity provided by the current and voltage partition circuit has a voltage not lesser than an operation voltage of the first power supply.

17. The charging method according to claim 14, wherein the input electricity provided by the current and voltage partition circuit is clamped to have an electrical current-time product being less or equal to charge capacity of the first power supply.

18. The charging method according to claim 14, wherein the second electromagnetic inductive element has an electromagnetic induction field with which a plurality of identification devices can be charged within an effective range of the electromagnetic induction field.

19. The charging method according to claim 18, wherein a shortest distance between the identification device and the charging device is zero.

20. The charging method according to claim 18, wherein a longest distance between the identification device and the charging device is equivalent to the longest distance of the effective range of the electromagnetic induction field generated by the second electromagnetic inductive element.

* * * * *